United States Patent [19]

Nagano

[11] Patent Number: 4,754,853
[45] Date of Patent: Jul. 5, 1988

[54] CALIPER BRAKE FOR A BICYCLE
[75] Inventor: Masashi Nagano, Izumi, Japan
[73] Assignee: Shimano Industrial Company Limited, Osaka, Japan
[21] Appl. No.: 61,228
[22] Filed: Jun. 12, 1987
[30] Foreign Application Priority Data
   Jun. 20, 1986 [JP]  Japan .............................. 61-95288[U]
[51] Int. Cl.$^4$ ............................................. F16D 65/44
[52] U.S. Cl. ................................ 188/24.19; 188/71.7; 188/216
[58] Field of Search ............... 188/24.12, 24.19, 24.22, 188/71.7, 196 M, 196 F, 216, 217

[56] References Cited
   U.S. PATENT DOCUMENTS
   3,035,666  5/1962  Beeskow ............................ 188/217
   3,297,115  1/1967  Waloen et al. ................ 188/71.7 X
   3,572,476  3/1971  Laverdant ......................... 188/216
   4,301,894  11/1981 Arai ..................................... 188/216
   4,546,858  10/1985 Nagano ............................ 188/24.19

Primary Examiner—Duane A. Reger
Attorney, Agent, or Firm—Stevens, Davis, Miller & Mosher

[57] ABSTRACT

A caliper brake for a bicycle, in which a pair of brake arms having brake shoes are supported independently rotatably to fixing bases fixed to the bicycle frame and between the fixing bases and the brake arms are interposed return springs for biasing the brake arms in a direction of enlarging the distance beween the brake shoes. The brake is provided with a biasing force adjuster for adjusting the biasing force applied by at least one of the return springs to its associated brake arm.

6 Claims, 2 Drawing Sheets

CALIPER BRAKE FOR A BICYCLE

FIELD OF THE INVENTION

The present invention relates to a caliper brake for a bicycle, and more particularly, to a caliper brake which is provided with a pair of brake arms each having a brake shoe and supported independently rotatably to respective fixing bases, which further includes between the respective brake arms and fixing bases a pair of return springs for biasing the brake arms in the direction of enlarging a distance between the brake shoes and which is called a cantilever type or a center-pull type caliper brake.

BACKGROUND OF THE INVENTION

Generally, the cantilever type caliper brake, as disclosed in Japanese Utility Model Publication Gazette No. 51-25,893, is constructed such that (1) a pair of brake arms each having a brake shoe is supported independently rotatably to a pair of fixing bases welded to a front fork or a rear fork at the bicycle frame, (2) between each fixing base and each brake arm is interposed a return spring for biasing the brake arms to enlarge the distance between the brake shoes, and (3) a hanging wire is provided across the idle ends of the brake arms, so that the hanging wire is pulled at the middle point thereof to swing the brake arms for exerting the braking action.

The center-pull type caliper brake is so constructed that one fixing base is fixed to a bridge provided across the front fork or the rear fork, a pair of brake arms is supported independently rotatably to the fixing base, return springs are provided at the brake arms respectively the same as in the above-described cantilever type caliper brake, and a hanging wire is provided to be pulled at the middle point thereof for exerting the braking action.

It is difficult to position the fixing bases of the above-described cantilever type caliper brake their at proper positions; as a result the bases may be vertically shifted from their proper positions. Also, it is very difficult to fix each fixing base such that its shaft axis is kept parallel to the plane perpendicular to the axis of the wheel rim of the bicycle; as a result, the shaft axis may be, e.g., tilted laterally of the perpendicular plane. As a result, each brake shoe is subject to being positioned inaccurately relative to the wheel rim, whereby a shoe clearance between the respective brake shoes and the wheel rim cannot be uniform, thereby creating a problem in that the braking effect is one-sided.

Separate return springs are used in the respective brake arms, whereby it is difficult to achieve a uniform spring force for each return spring because of manufacturing variations. As a result, each brake shoe is subject to being positioned inaccurately with respect to the wheel rim, thereby creating also a problem in that the braking effect is one-sided.

In addition, in the center-pull type caliper brake, the fixing base can force an altered mounting angle with respect to the bicycle frame to position each brake shoe inaccurately with respect to the wheel rim, or the return springs may not have a uniform spring force, whereby a uniform shoe clearance cannot be obtained.

SUMMARY OF THE INVENTION

An object of the invention is to provide a caliper brake for a bicycle which, even when each brake shoe is positioned inaccurately with respect to the wheel rim at the bicycle because a fixing base is positioned inaccurately to the bicycle frame or a return spring is not uniform in its spring force, has the capability of correcting the position of the brake shoe with respect to the wheel rim by simply adjusting a biasing force of the return spring applied to the brake arm, thereby enabling a shoe clearance between each brake shoe and the wheel rim to be uniform.

The present invention provides a caliper brake for a bicycle, which is provided with one or a pair of fixing bases having pivot shafts to be fixed to the bicycle frame, a pair of brake arms having brake shoes and supported independently rotatably to the pivot shafts respectively, a return spring interposed between each fixing base and each brake arm to bias each brake arm in the direction of enlarging a distance between the brake shoes, and a biasing force adjusting means for adjusting the biasing force of at least one return spring.

The return spring preferably is a coil spring having a first spring leg or end and a second spring leg or end, the first spring end engaging with the biasing force adjusting means and being shifted in positions by adjusting the adjusting means, thereby adjusting the biasing force of the return spring acting on each brake arm.

Also, the adjusting means is supported preferably to each brake arm, in which the first spring end of the return spring is shiftable with respect to the brake arm to engage with the adjusting means, the second spring end being retained to the fixing base.

Furthermore, the adjusting means preferably uses an adjuster comprising a screw. The adjuster may engage directly with the first spring end at the return spring, but preferably employs a retainer provided with a retaining portion for retaining the first spring end, the retainer being supported rotatably with respect to each brake arm and rotated by the adjuster.

In addition, a pair of fixing bases is used in the cantilever type caliper brake and one fixing base in the center-pull type caliper brake, the construction of which will be easy to understand form the prior art.

In a condition where the fixing base is positioned inaccurately to the bicycle frame or the return spring is not uniform in its spring force to thereby inaccurately position each brake shoe relative to the wheel rim, the adjusting means adjusts the biasing force of the return spring to the brake arm, thereby correcting the position of the brake shoe with respect to the wheel rim and make uniform the shoe clearance between each brake shoe and the wheel rim to prevent one-sided braking effects.

The above and further objects and novel features of the invention will be more fully apparent from the following detailed description when the same is read in connection with the accompanying drawings.

BRIEF DESCRIPTION OF THE INVENTION

FIG. 1 is a front view of an embodiment of a caliper brake for a bicycle of the present invention, FIG. 2 is an enlarged view of a support portion of a first brake arm for a fixing base, FIG. 3 is an enlarged sectional view of a support portion of a second brake arm for a fixing base, FIG. 4 is a rear view of the first brake arm, and FIG. 5 is a front view of a retainer.

DETAILED DESCRIPTION OF THE INVENTION

Figure 1:
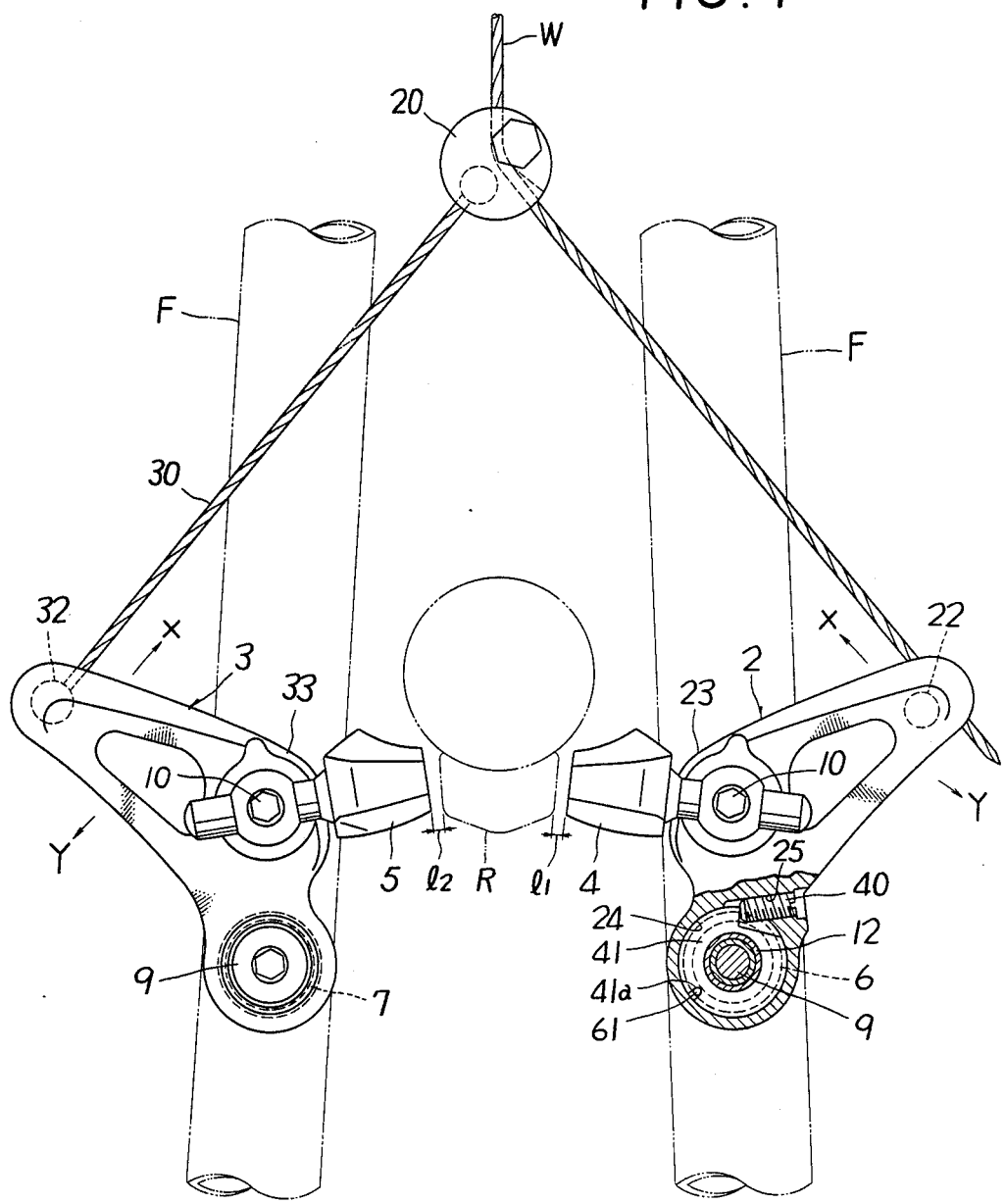
Figure 2:
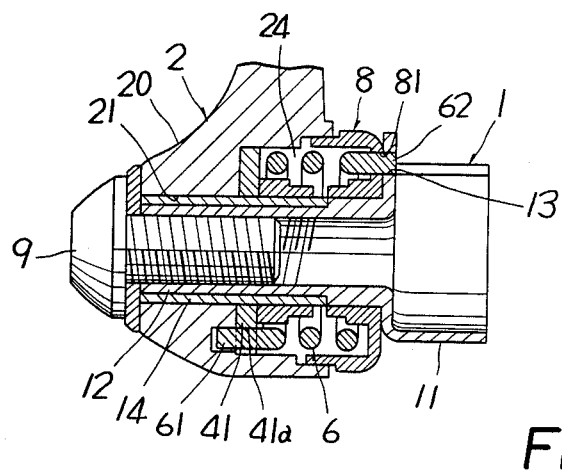
Figure 3:
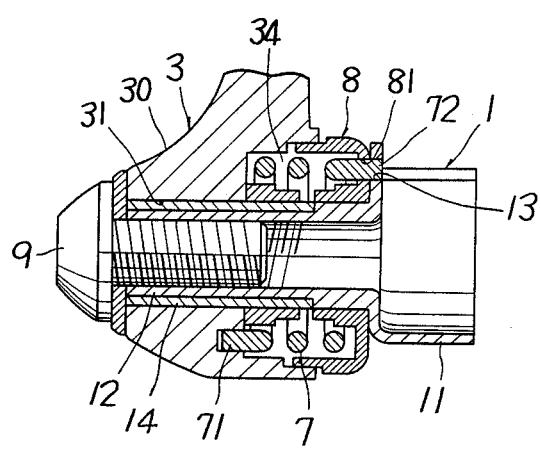

In the drawings, a cantilever type caliper brake is shown and constructed such that a pair of first and second brake arms 2 and 3 having brake shoes 4 and 5 are supported independently rotatably to a pair of fixing bases 1 fixed by welding to a front fork or a rear fork at the bicycle frame. Between the fixing bases 1 and the brake arms 2 and 3 are interposed a pair of first and second return springs 6 and 7 to bias the brake arms 2 and 3 in the direction of enlarging the distance between the brake shoes 4 and 5 respectively. A control wire W is pulled to rotate the brake arms 2 and 3 each in the direction of the arrow X in FIG. 1 against the return springs 6 and 7, thereby exerting a braking action. The wire W is loosened to enable each brake amr 2 or 3 to rotate by a biasing force of each return spring 6 or 7 in the direction of the arrow Y in FIG. 1, thereby restoring the brake arms 2 and 3.

The fixing bases 1 each comprise a washer 11 having a mounting surface to the frame F and a tubular pivot shaft 12 projecting outwardly from the end surface opposite to the mounting surface at the washer 11. Tubular pivot shafts 12 are provided at their inner peripheries with screw threads respectively. Onto the other periphery of the root of each pivot shaft 12 is fitted a substantially cup-shaped cap 8 having an insertion bore 81, and each washer 11 includes a retainer bore 13 corresponding to insertion bore 81.

The brake arms 2 and 3 comprise bell cranks each bent at an intermediate portion. Brake arms 2 and 3 are provided at one ends with pivot portions 20 and 30 having fitting bores 21 and 31, at their other end with wire mounting portions 22 and 32, and at their intermediate bent portions with brake shoe mounting portions 23 and 33 respectively. Fitting bores 21 and 31 are fitted onto the outer peripheries of the utmost ends of the pivot shafts 12. Screws 9 screw with the threaded bores at the pivot shafts 12 to mount the brake arms 2 and 3 rotatably thereto through spacers 14 respectively, and the brake shoes 4 and 5 are mounted on the shoe mounting portions 23 and 33 though clamp shafts 10 respectively. At the pivot portions 20 and 30 are provided cavities 24, 34 in continuation of one end of fitting bores 21. Cavities 24, 34 31 and open toward the fixing bases 1 and are closed with caps 8, so that the return springs 6 and 7 are housed in the closed cavities 24 and 34 respectively. The control wire W, which is connected at one end to a brake lever, is connected at its other end to the wire mounting portion 22 at the first brake arm 2. A connecting wire 30 connects the wire mounting portion 32 at the second brake arm 3 and a carrier 20 securing the wire W at its free end side.

The return springs 6 and 7 comprise coil springs and are both provided at respective ends with first spring ends 61 and 71 and second spring ends 62 and 72 projecting outwardly respectively. First spring ends 61 and 71 are disposed at the brake arms 2 and 3, and second spring ends 62 and 72 are inserted into the insertion bore 81 and are retained retainer bores 13 at the fixing bases 1 respectively.

In the embodiment of the invention in FIGS. 1 through 5, the first spring end 71 of the second return spring 7 is retained to the second brake arm 3, and between the first spring end 61 of the first return spring 6 disposed at the first brake arm 2 and the first brake arm 2 is provided a biasing force adjusting means for adjusting a biasing force of the first return spring 6 to the first brake arm 2 so that it is equalized with the second return spring 7.

The biasing force adjusting means comprises an adjuster 40 formed preferably of a screw and a substantially disc-shaped retainer 41 provided with a retaining portion 41a to retain the first spring end 61 and rotatable by thrust of the adjuster 40 to shift the first spring end 61 at the first return spring 6. The first brake arm 2 is provided with a threaded bore 25 extending tangentially of the cavity 24 and open at the outside surface of the first brake arm 2, with adjuster 40 screwing with the threaded bore 25. The retainer 41 is housed rotatably in the cavity 24. First spring end 61 is retained to the retaining portion 41a. A adjuster 40 is rotated to shift the first spring end 61 with respect to the first brake arm 2, thereby adjusting the biasing force of the first return spring 6 to the first brake arm 2 with respect to the second return spring 7.

Figure 5:
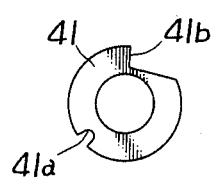

The retainer 41, as shown in FIG. 5, is provided with a striking face 41b abutting against the utmost end of the adjuster 40 and positioned diametrically symmetrically with the retaining portion 41a.

Figure 4:
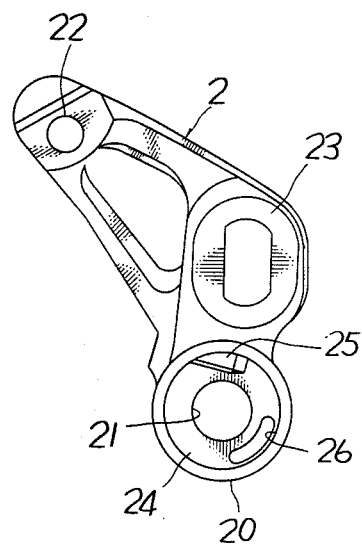

The cavity 24 at the first brake arm 2, as shown in FIG. 4, has a wall provided with a circular arc-shaped elongate bore 26, which receives the first spring end 61 to restrict displacement thereof with respect to the first brake arm 2, thereby enabling the biasing force of the first return spring 6 to be adjusted in a predetermined range.

The mounting surface of each fixing base 1 is welded to the bicycle frame. In a condition where (1) one or both of fixing bases 1 are fixed vertically inaccurately to the frame, the axis of the pivot shaft 12 at each fixing base 1 is tilted with respect to the plane perpendicular to the axis of the wheel rim, or (2) variation in the spring force of each return spring 6 or 7 causes each brake shoe 4 or 5 to shift with respect to the wheel rim so as to make non-uniform the shoe clearance between each brake shoe 4 or 5 and the wheel rim, the adjustment is carried out as follows: adjuster 40 is rotated by a tool or the like, and retainer 41 is rotated to move the first spring end 61 at the first return spring 6 with respect to the first brake arm 2, thereby adjusting the biasing force of the first return spring 6 to the first brake arm 2 with respect to the second return spring 7. Hence, a shoe clearance $l_1$ between the brake shoe 4 at the first brake arm 2 and the wheel rim R is uniform with shoe clearance $l_2$ between the brake shoe 5 at the second brake arm 3 and the wheel rim R.

When $l_1$ is smaller than $l_2$, the adjuster 40 is screwed forwardly to shift the first spring end 61 in the direction of contracting a coil diameter of the first return spring 6, thereby increasing the biasing force of the first return spring 6 to the first brake arm 2 with respect to that of the second return spring 7. When $l_1$ is larger than $l_2$, the adjuster 40 is screwed backwardly to shift the first spring end 61 in the direction of enlarging the coil diameter thereof, thereby reducing the biasing force of the first return spring 6 to the first brake arm 2 with respect to the second return spring 7.

Thus, the biasing force of the first return spring 6 is adjusted on the basis of $l_2$ to equalize $l_1$ therewith so that the adjustment for such equalizing can be carried out with ease.

Alternatively, the biasing force adjusting means may use adjuster 40 only so that the utmost end thereof may abut against the first spring end 61, or the adjuster 40 may be omitted and retainer 41 may be provided with a dial operable from the exterior to thereby directly rotate the retainer 41. Also alternatively, a cam body may be used. Hence, the biasing force adjusting means is not particularly defined or limited in its construction.

Alternatively, the biasing force adjusting means may be provided between the second spring end 62 at the first return spring 6 and the first fixing base 1.

Also, the biasing force adjusting means may alternatively be provided at both the first and second springs 6 and 7 sides.

The cantilever type caliper brake has been described above, but the center-pull type caliper brake comprising one fixing base, a pair of brake arms having brake shoes and pivoted to the fixing base, and a pair of return springs, can be constructed similarly.

As seen from the above, since the caliper brake constructed as described above is provided with the biasing force adjusting means between the first spring end of at least one return spring and the fixing base 1 or the brake arm, when the fixing base is fixed inaccurately to the bicycle frame or the spring force of each return spring varies so that the shoe clearance is not uniform, the biasing force adjusting means can be operated to adjust the shoe clearance between each brake shoe and the wheel rim, thereby preventing a one-sided braking effect.

While an embodiment of the invention has been shown and described above, the invention is not limited to the specific construction of this described embodiment, since this embodiment described in the specification is merely exemplary rather than defined or limited.

What is claimed is:

1. A caliper brake for a bicycle, comprising:
   (a) a fixing base means adapted to be fixed to the bicycle frame and comprising a first pivot shaft and a second pivot shaft;
   (b) a first brake arm and a second brake arm each having a brake shoe supported rotatably to respectively said first pivot shaft and said second pivot shaft;
   (c) a first return spring interposed between said fixing base means and said first brake arm for biasing said first brake arm in a direction to enlarge a distance between said brake shoe of said first brake arm and said brake shoe of said second brake arm;
   (d) a second return spring interposed between said fixing base means and said second brake arm for biasing said second brake arm in a direction to enlarge said distance between said brake shoe of said first brake arm and said brake shoe of said second brake arm; and
   (e) a biasing force adjusting means for adjusting a biasing force applied by said first return spring against said first brake arm.

2. A caliper brake for a bicycle according to claim 1, wherein said first return spring comprises a coil spring having a first spring leg and a second spring leg, said first spring leg engaging with said adjusting means to be displaced responsive to adjustment of said adjusting means.

3. A caliper brake for a bicycle according to claim 2, wherein said adjusting means is supported to said first brake arm, said first spring leg being displaceable with respect to said first brake arm and said second spring leg being retained to said fixing base means.

4. A caliper brake for a bicycle according to claim 2, wherein said adjusting means includes a retaining portion to retain said first spring leg, a retainer supported rotatably to said first brake arm and an adjuster which rotatably operates said retainer to adjust said first spring leg in position.

5. A caliper brake for a bicycle according to claim 4, wherein a pivot portion of said first brake arm supported rotatably to said first pivot shaft is provided with a fitting bore to be fitted onto said first pivot shaft, a cavity in continuation of said fitting bore and open toward said fixing base means, and a threaded bore extending tangentially of said cavity and open at the outside surface of said first brake arm, said cavity housing therein said retainer which is rotatable therein, said threaded bore screwing with said adjuster which comprises a screw which abuts against a striking surface of said retainer for rotatable operation thereof.

6. A caliper brake for a bicycle according to claim 5, wherein said first brake arm is provided with a circular arc-shaped restricting groove which receives therein said first spring leg engageable with said retainer so as to restrict an adjusting range of a biasing force adjusted by said adjuster.

* * * * *

REEXAMINATION CERTIFICATE (3602nd)
United States Patent
Nagano

[11] B1 4,754,853
[45] Certificate Issued Aug. 18, 1998

[54] CALIPER BRAKE FOR A BICYCLE

[75] Inventor: Masashi Nagano, Izumi, Japan

[73] Assignee: Shimano Industrial Company Limited, Sakai, Japan

Reexamination Request:
No. 90/004,815, Oct. 22, 1997

Reexamination Certificate for:
Patent No.: 4,754,853
Issued: Jul. 5, 1988
Appl. No.: 61,228
Filed: Jun. 12, 1987

[30] Foreign Application Priority Data

Jun. 20, 1986 [JP] Japan ............... 61-95288 U

[51] Int. Cl.$^6$ ............................................. F16D 65/44
[52] U.S. Cl. .................. 188/24.19; 188/71.7; 188/216
[58] Field of Search ........................... 188/24.12, 24.19, 188/24.22, 71.7, 196 M, 196 F, 216, 217

[56] References Cited

U.S. PATENT DOCUMENTS

| | | | |
|---|---|---|---|
| 3,035,666 | 5/1962 | Beeskow | 188/217 |
| 3,297,115 | 1/1967 | Walden et al. | 188/71.7 |
| 3,572,476 | 3/1971 | Laverdant | 188/216 |
| 4,301,894 | 11/1981 | Arai | 188/216 |
| 4,546,858 | 10/1985 | Nagano | 188/24.19 |
| 4,765,443 | 8/1988 | Cunningham | 188/24.21 |

OTHER PUBLICATIONS

Cantilever Brake Design published prior to Jun. 12, 1986.

*Primary Examiner*—Matthew C. Graham

[57] ABSTRACT

A caliper brake for a bicycle, in which a pair of brake arms having brake shoes are supported independently rotatably to fixing bases fixed to the bicycle frame and between the fixing bases and the brake arms are interposed return springs for biasing the brake arms in a direction of enlarging the distance between the brake shoes. The brake is provided with a biasing force adjuster for adjusting the biasing force applied by at least one of the return springs to its associated brake arm.

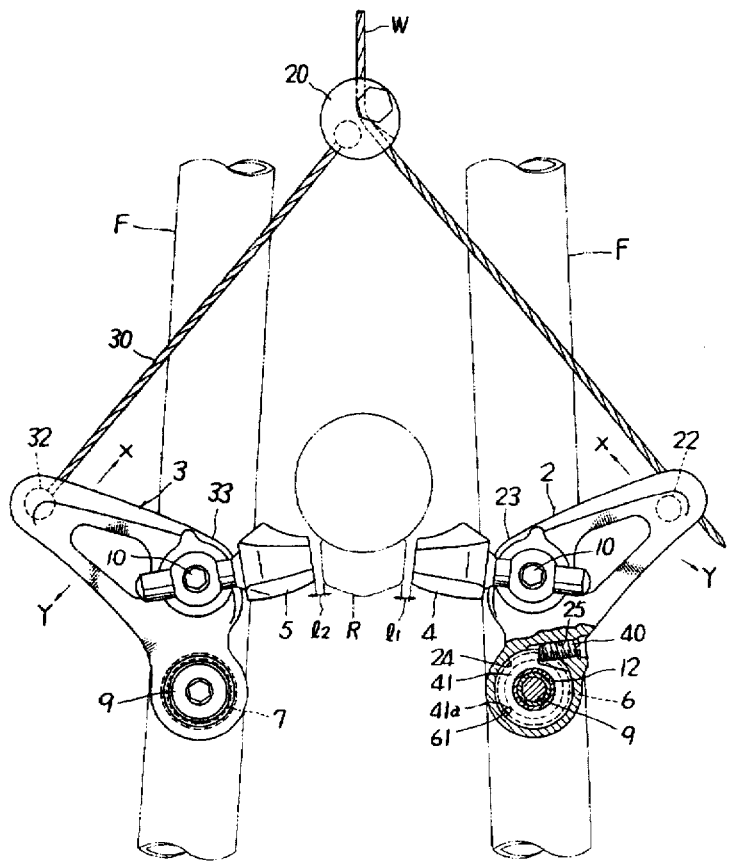

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5 and 6 is confirmed.

Claims 1–2 are determined to be patentable as amended.

Claims 3–4, dependent on an amended claim, are determined to be patentable.

New claims 7–63 are added and determined to be patentable.

1. A caliper brake for a bicycle, comprising:
   (a) a fixing base means adapted to be fixed to the bicycle frame and comprising a first pivot shaft and a second pivot shaft;
   (b) a first brake arm and a second brake arm each having a brake shoe supported rotatably to respectively said first pivot shaft and said second pivot shaft;
   (c) a first return spring interposed between said fixing base means and said first brake arm for biasing said first brake arm in a direction to enlarge a distance between said brake shoe of said first brake arm and said brake shoe of said second brake arm;
   (d) a second return spring interposed between said fixing base means and said second brake arm for biasing said second brake arm in a direction to enlarge said distance between said brake shoe of said first brake arm and said brake shoe of said second brake arm; and
   (e) a biasing force adjusting means for adjusting a biasing force applied by said first return spring against said first brake arm, *wherein said biasing force adjusting means includes an adjusting screw for adjusting a position of the first return spring.*

2. [A caliper brake for a bicycle according to claim 1.] *A caliper brake for a bicycle, comprising:*
   *(a) a fixing base means adapted to be fixed to the bicycle frame and comprising a first pivot shaft and a second pivot shaft;*
   *(b) a first brake arm and a second brake arm each having a brake shoe supported rotatably to respectively said first pivot shaft and said second pivot shaft;*
   *(c) a first return spring interposed betweed said fixing base means and said first brake arm for biasing said first brake arm in a direction to enlarge a distance between said brake shoe of said first brake arm and said brake shoe of said second brake arm;*
   *(d) a second return spring interposed between said fixing base means and said second brake arm for biasing said second brake arm in a direction to enlarge said distance between said brake shoe of said first brake arm and said brake shoe of said second brake arm;*
   *(e) a biasing force adjusting means for adjusting a biasing force aplied by said first return spring against said first brake arm; and* wherein said first return spring comprises a coil spring having a first spring leg and a second spring leg, said first spring leg engaging with said adjusting means to be displaced responsive to adjustment of said adjusting means.

7. *A caliper brake for a bicycle according to claim 1 wherein said adjusting screw moves an end of said first return spring relative to said first brake arm.*

8. *A caliper brake for a bicycle according to claim 1 wherein said adjusting screw is mounted within a screw mounting member, and wherein said adjusting screw moves an end of said first return spring relative to said screw mounting member.*

9. *A caliper brake for a bicycle according to claim 1 wherein said adjusting means includes a retainer for retaining an end of said first return spring.*

10. *A caliper brake for a bicycle according to claim 9 wherein said retainer includes a central opening.*

11. *A caliper brake for a bicycle according to claim 10 wherein said screw moves in a direction substantially tangential to said central opening.*

12. *A caliper brake for a bicycle according to claim 11 wherein said central opening has a circular shape.*

13. *A caliper brake for a bicycle according to claim 10 wherein said first pivot shaft has a first cylindrical portion disposed within said central opening.*

14. *A caliper brake for a bicycle according to claim 13 wherein said first pivot shaft has a second cylindrical portion disposed within a fitting bore formed in said first brake arm.*

15. *A caliper brake for a bicycle according to claim 9 wherein said retainer includes a striking face that abuts against said adjusting screw so that said retainer rotates relative to said first brake arm when said adjusting screw is rotated.*

16. *A caliper brake for a bicycle according to claim 15 wherein said striking face is disposed on an outer peripheral surface of said retainer.*

17. *A caliper brake for a bicycle according to claim 16 wherein said retainer includes a central opening.*

18. *A caliper brake for a bicycle according to claim 17 wherein said adjusting screw moves in a direction substantially tangential to said central opening.*

19. *A caliper brake for a bicycle according to claim 18 wherein said central opening has a circular shape.*

20. *A caliper brake for a bicycle according to claim 17 wherein said first pivot shaft has a first cylindrical portion disposed within said central opening.*

21. *A caliper brake for a bicycle according to claim 20 wherein said first pivot shaft has a second cylindrical portion disposed within a fitting bore formed in said first brake arm.*

22. *A caliper brake for a bicycle according to claim 9 wherein said retainer is movably mounted relative to said first brake arm.*

23. *A caliper brake for a bicycle according to claim 22 wherein said adjusting screw is operatively coupled to said retainer so that said adjusting screw causes said retainer to move relative to said first brake arm when said adjusting screw is rotated.*

24. *A caliper brake for a bicycle according to claim 23 wherein said retainer includes a central opening.*

25. *A caliper brake for a bicycle according to claim 24 wherein said adjusting screw moves in a direction substantially tangential to said central opening.*

26. *A caliper brake for a bicycle according to claim 25 wherein said central opening has a circular shape.*

27. *A caliper brake for a bicycle according to claim 24 wherein said first pivot shaft has a first cylindrical portion disposed within said central opening.*

28. A caliper brake for a bicycle according to claim 27 wherein said first pivot shaft has a second cylindrical portion disposed within a fitting bore formed in said first brake arm.

29. A caliper brake for a bicycle according to claim 23 wherein said retainer includes a striking face that abuts against said adjusting screw so that said retainer moves relative to said first brake arm when said adjusting screw is rotated.

30. A caliper brake for a bicycle according to claim 29 wherein said striking face is disposed on an outer peripheral surface of said retainer.

31. A caliper brake for a bicycle according to claim 30 wherein said retainer includes a central opening.

32. A caliper brake for a bicycle according to claim 31 wherein said adjusting screw moves in a direction substantially tangential to said central opening.

33. A caliper brake for a bicycle according to claim 32 wherein said central opening has a circular shape.

34. A caliper brake for a bicycle according to claim 31 wherein said first pivot shaft has a first cylindrical portion disposed within said central opening.

35. A caliper brake for a bicycle according to claim 34 wherein said first pivot shaft has a second cylindrical portion disposed within a fitting bore formed in said first brake arm.

36. A caliper brake for a bicycle according to claim 9 wherein said retainer is movably mounted relative to said first pivot shaft.

37. A caliper brake for a bicycle according to claim 36 wherein said adjusting screw is operatively coupled to said retainer so that said adjusting screw causes said retainer to move relative to said first brake arm when said adjusting screw is rotated.

38. A caliper brake for a bicycle according to claim 37 wherein said retainer includes a central opening.

39. A caliper brake for a bicycle according to claim 38 wherein said adjusting screw moves in a direction substantially tangential to said central opening.

40. A caliper brake for a bicycle according to claim 39 wherein said central opening has a circular shape.

41. A caliper brake for a bicycle according to claim 38 wherein said first pivot shaft has a first cylindrical portion disposed within said central opening.

42. A caliper brake for a bicycle according to claim 41 wherein said first pivot shaft has a second cylindrical portion disposed within a fitting bore formed in said first brake arm.

43. A caliper brake for a bicycle according to claim 37 wherein said retainer includes a striking face that abuts against said adjusting screw so that said retainer moves relative to said first brake arm when said adjusting screw is rotated.

44. A caliper brake for a bicycle according to claim 43 wherein said striking face is disposed on an outer peripheral surface of said retainer.

45. A caliper brake for a bicycle according to claim 44 wherein said retainer includes a central opening.

46. A caliper brake for a bicycle according to claim 45 wherein said adjusting screw moves in a direction substantially tangential to said central opening.

47. A caliper brake for a bicycle according to claim 46 wherein said central opening has a circular shape.

48. A caliper brake for a bicycle according to claim 45 wherein said first pivot shaft has a first cylindrical portion disposed within said central opening.

49. A caliper brake for a bicycle according to claim 48 wherein said first pivot shaft has a second cylindrical portion disposed within a fitting bore formed in said first brake arm.

50. A caliper brake for a bicycle according to claim 9 wherein said retainer is rotatably mounted relative to said first brake arm, and wherein said retainer is rotatably mounted around said first pivot shaft.

51. A caliper brake for a bicycle according to claim 50 wherein said adjusting screw is operatively coupled to said retainer so that said adjusting screw causes said retainer to rotate relative to said first brake arm when said adjusting screw is rotated.

52. A caliper brake for a bicycle according to claim 51 wherein said retainer includes a central opening.

53. A caliper brake for a bicycle according to claim 52 wherein said adjusting screw moves in a direction substantially tangential to said central opening.

54. A caliper brake for a bicycle according to claim 53 wherein said central opening has a circular shape.

55. A caliper brake for a bicycle according to claim 52 wherein said first pivot shaft has a first cylindrical portion disposed within said central opening.

56. A caliper brake for a bicycle according to claim 55 wherein said first pivot shaft has a second cylindrical portion disposed within a fitting bore formed in said first brake arm.

57. A caliper brake for a bicycle according to claim 51 wherein said retainer includes a striking face that abuts against said adjusting screw so that said retainer rotates relative to said first brake arm when said adjusting screw is rotated.

58. A caliper brake for a bicycle according to claim 57 wherein said striking face is disposed on an outer peripheral surface of said retainer.

59. A caliper brake for a bicycle according to claim 58 wherein said retainer includes a central opening.

60. A caliper brake for a bicycle according to claim 59 wherein said adjusting screw moves in a direction substantially tangential to said central opening.

61. A caliper brake for a bicycle according to claim 60 wherein said central opening has a circular shape.

62. A caliper brake for a bicycle according to claim 59 wherein said first pivot shaft has a first cylindrical portion disposed within said central opening.

63. A caliper brake for a bicycle according to claim 62 wherein said first pivot shaft has a second cylindrical portion disposed within a fitting bore formed in said first brake arm.

* * * * *